May 8, 1923.

H. N. WADE

CONTROLLER FOR ELECTRIC MOTORS

Filed Nov. 18, 1920    2 Sheets-Sheet 2

INVENTOR
Henry N. Wade
BY
ATTORNEY

Patented May 8, 1923.

1,454,527

UNITED STATES PATENT OFFICE.

HENRY N. WADE, OF SHOREWOOD, WISCONSIN, ASSIGNOR TO THE CUTLER-HAMMER MFG. CO., OF MILWAUKEE, WISCONSIN, A CORPORATION OF WISCONSIN.

CONTROLLER FOR ELECTRIC MOTORS.

Application filed November 18, 1920. Serial No. 424,321.

*To all whom it may concern:*

Be it known that I, HENRY N. WADE, a citizen of the United States, residing at Shorewood, in the county of Milwaukee and State of Wisconsin, have invented new and useful Improvements in Controllers for Electric Motors, of which the following is a full, clear, concise, and exact description, reference being had to the accompanying drawing, forming a part of this specification.

This invention relates to controllers for electric motors and while not limited thereto is particularly applicable as a starting and speed regulating controller for alternating current motors.

An object of the invention is that of providing a controller having separate but associated elements providing for controlling respectively the line connections and the circuit resistance of a motor together with means including interlocks providing for operating of one of said elements by and during normal operation of the other.

Another object is that of providing such a controller adapted to effect starting and acceleration of a motor through unidirectional actuation of a single operating member.

Another object is that of providing such a controller wherein provision is made for completing the line connections of the motor only under conditions insuring protection of the motor by the maximum value of circuit resistance.

Another object is that of providing a controller possessing, in addition to the foregoing functional characteristics, that of maintaining the line connections subject to interruption upon failure of the supplied voltage.

Other objects and advantages will hereinafter appear.

According to the present invention it is proposed to provide a suitable number of similar jointly operable line switches for controlling the line connections of the motor said switches to be latched in closed position subject to release upon failure of voltage of the supply circuit and to provide a resistance controlling rheostat, said switches and said rheostat having an operative connection providing for actuation of the former upon operation of the latter by means of an ordinary handle, said rheostat to be latched in running position and being adapted to return automatically to starting position upon release of its latching means, or upon release of its actuating means prior to complete movement thereof to running position. Said rheostat is further adapted upon such return movement to effect automatic opening of the line switches whereas said operative connection provides for closure of said line switches only upon actuation of said rheostat from off position.

The accompanying drawing illustrates an embodiment of the invention adapted to the control of a two phase four wire alternating current motor, it being, however, understood that the invention is applicable with analogous advantages to the control of other types of motor.

In the drawing—

Fig. 1 is a front elevational view of such controller; while,

Figure 1:
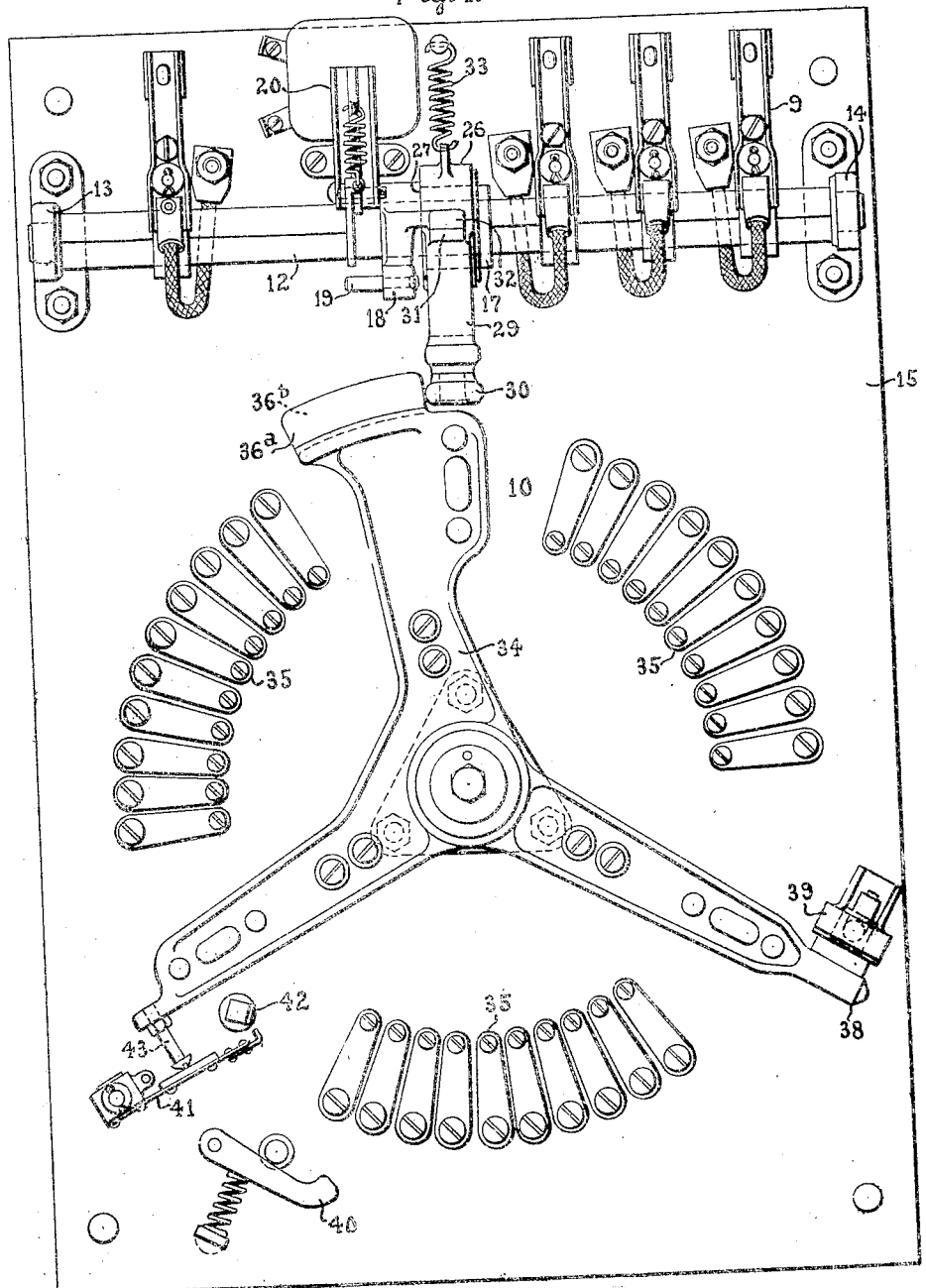

Referring to the drawing the same illustrates a line switch mechanism 9 and a rheostat 10, the latter being provided with an operating handle 11 and said switch and rheostat being provided with mechanism for effecting operation of the former by and during operation of the latter together with suitable interlocks for correlating the joint action of said devices.

More particularly the switch mechanism 9 comprises four similar switch contactors mounted in spaced and insulated relation upon a common operating shaft 12 and movable thereby to co-operate with corresponding fixed contacts to control the line connections.

Figure 2:
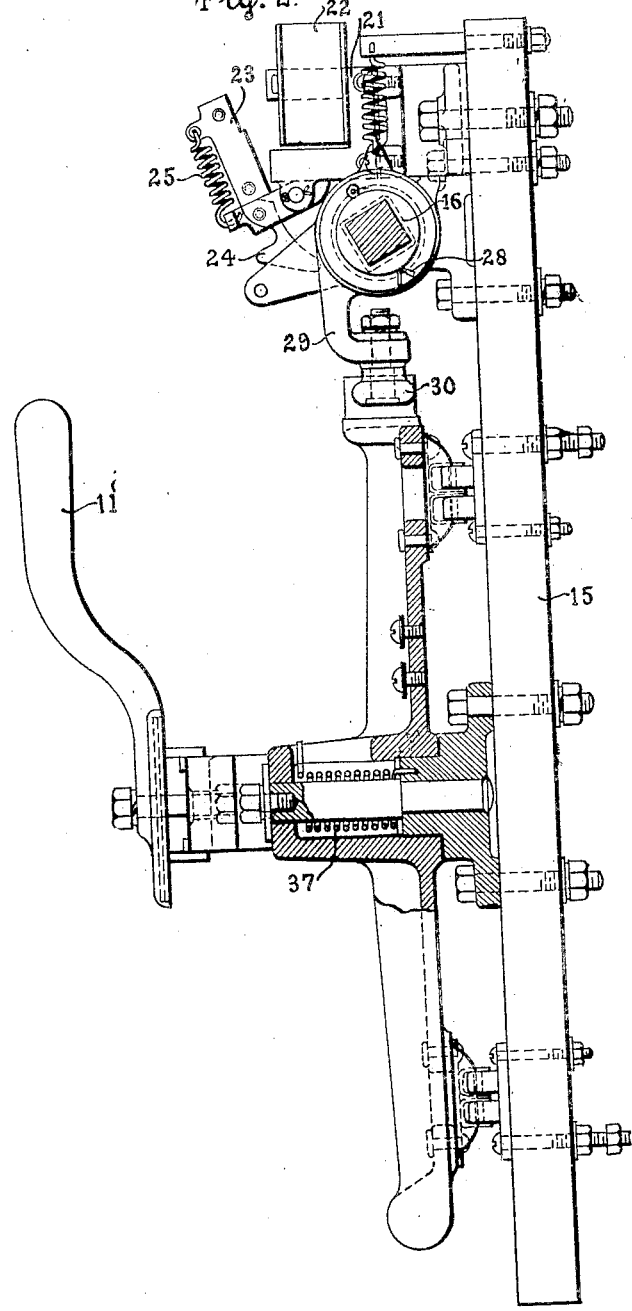
Fig. 2 is a side elevational view partly in section of the same.

In practice the shaft 12 is preferably mounted for oscillation between a pair of spaced brackets 13 and 14, the latter together with the fixed switch contacts being carried upon a suitable panel 15. Said shaft as shown in Fig. 2 is preferably of square cross section to facilitate mounting of the several switch contactors thereon and is preferably surrounded with a suitable insulating sleeve 16 for insulation of said contactors from one another. A collar 17 is rigidly secured to said shaft preferably centrally of the latter, said collar being provided with a radially extending arm 18, the latter carrying adjacent its terminal portion a laterally extending stud 19 while an electro-magnetic latching device 20 of known or conventional construction is adapted to co-operate with said stud for releasably holding said switches in closed position.

Said latching device 20 may advantageously comprise a magnetic frame 21 carried by the panel 15 and provided with a coil 22 and with a hinged armature 23 the latter carrying a resiliently held latch 24 for direct co-operation with the stud 19 to maintain the switches closed, subject to release upon de-energization of the coil 22. A spring 25 serves to maintain the latch 24 normally in holding relation while providing for movement of said stud to its latched-in position during energization of coil 22.

An additional collar member 26 is arranged about the aforementioned collar 17, being loosely mounted thereon for movement relative thereto, said collar 17 having a shoulder 27 and a cotter pin 28 or the like to limit axial shifting of the collar 26 and said latter collar having an integral or rigidly secured operating arm 29 projecting toward the rheostat 10 and terminally carrying a roller 30. Said collars 17 and 26 are provided respectively with lugs 31 and 32 for limiting relative angular movement thereof in one direction while a spring 33 serves to bias the collar 26 against angular movement in either direction from the position illustrated wherein the aforementioned lugs are in engagement with one another. Said collar 26 is thus movable by means of its attached operating arm 29 to effect closure of the line switches and is moreover operable in the opposite direction without influence upon said switches, the spring 33 tending at all times to return said arm and collar to the position shown.

The rheostat 10 is in general of known construction, comprising a brush carrying arm or spider 34 movable angularly in opposite directions to effect co-operation with suitably arranged contact buttons 35. In the present instance said buttons are illustrated as arranged in three groups to correspond with the assumed number of phases of the motor secondary circuit, the spider 34 being similarly provided with three brush carrying arms.

Said spider 34 is provided with a cam member having opposed cam surfaces 36$^a$ and 36$^b$ adapted to co-operate directly with the roller 30 of the switch operating mechanism aforedescribed, the arrangement being such that said mechanism is actuated for closing and latching in the line switches prior to engagement of the rheostat contacts but during movement of the spider 34 in a direction for causing such engagement. A spring 37 serves to bias the spider 34 against movement from the off position illustrated and to provide for automatic return of said spider to such position following displacement and release thereof. Said spider is further provided with a lug 38 adapted to co-operate with a stop or buffer 39 for limiting movement of the former under the action of the spring 37. A spring pressed latch 40 is arranged to engage said lug 38 upon movement of the spider to full running position and to maintain the latter in such position subject to forcible release by means of the operating handle 11.

A switch to control continuity of the energizing circuit of the coil 22 is also mounted upon the panel 15 adjacent the rheostat 10 and preferably comprises a resilient contactor 41 normally in electrical engagement with a fixed contact 42 but adapted to be moved and held out of such engagement by a stud 43 carried by the spider 34 upon movement of the latter to off position as illustrated.

The operation of the device may be described as follows. Upon clockwise rotation of the rheostat spider by means of its operating handle 11 the stud 43 first disengages the contactor 41 whereupon the latter engages its co-operating contact 42 whereby upon subsequent closure of the line switches the energizing circuit of coil 22 of the latching-in device is completed. Also the cam surface 36$^a$ engages the roller 30 and forces the arm 29 forwardly thereby effecting closure of the line switches, the same being maintained closed by the aforementioned energization of said latching-in device. Thereafter upon continued clockwise movement of the spider the circuit resistance is progressively excluded in the usual manner and upon arrival of the spider at its full running position the lug 38 is engaged and held by the latch 40 for maintaining the parts in running position. Should the operating handle 11 be released at any time prior to the aforementioned latching of the rheostat spider in its full running position, said spider is adapted under the influence of the spring 37 to return to the off position illustrated and in so doing to interrupt the energizing circuit of the coil 22 through the switch contacts 41 and 42 to thereby permit opening of the line switches. Also during such movement the cam surface 36$^b$ is adapted to ride over the roller 30 thus forcing the operating arm 29 toward the panel 15 but without influence on the position of the line switches.

Upon failure of voltage of the supply circuit at any time subsequent to closure and latching-in of the line switches, the latching-in device becomes de-energized for permitting opening of the line switches in the usual manner, whereas following opening of said switches the same cannot be reclosed by means of the handle 11 except following return movement of the spider to the off position illustrated.

Voluntary stopping of the motor after full acceleration thereof is effected by exerting upon the handle 11 sufficient force in a counter-clockwise direction to release the lug 38 from latch 40 whereupon said handle may be released and the various elements are adapted to function automatically in the manner aforedescribed for returning the spider to the position illustrated and also effecting opening of the line switches.

It is further obvious that a push button or other switch may be arranged to control the energizing circuit of coil 22, thus providing for remote control of the device for stopping.

The aforedescribed device, while particularly adapted to use as a starting and accelerating controller is further adapted with slight modification to use as a speed regulator.

Under such conditions the spring 37 and the latch 40 are omitted the remaining parts being adapted to function in a manner obvious from the foregoing description to effect starting, stopping and positive and negative acceleration of the motor as desired.

What I claim as new and desire to secure by Letters Patent is:

1. In a motor controller, the combination with associated mechanisms to control respectively the line connections and the circuit resistance of a motor, of an operating member for certain of said mechanisms and an operative connection providing for operation of both of said elements upon unidirectional movement of said operating member throughout a given range and also providing for reverse movement of said member through and beyond such range without affecting certain of said mechanisms.

2. In a motor controller, the combination with associated mechanisms to control respectively the line connections and the circuit resistance of a motor, of an operating member for certain of said mechanisms and an operative connection providing for operation of the other of said mechanisms upon unidirectional actuation of said member through a given position and requiring reverse movement of said member beyond such position prior to subsequent operation of certain of said mechanisms by said member.

3. In a motor controller, in combination, a primary switch unit mounted for oscillation about a given axis, a resistance commutating unit mounted for oscillation about an axis angularly displaced with reference to said former axis, an operating member for one of said units and an operative connection providing for operation of both of said units upon unidirectional actuation of said operating member throughout a given range, and also providing for reverse movement of said operating member through and beyond such range without affecting certain of said units.

4. In a motor controller, in combination, a primary switch unit mounted for oscillation about a given axis, a resistance commutating unit mounted for oscillation about an axis angularly displaced with reference to said former axis, an operating member for one of said units and an operative connection providing for operation of both of said units upon unidirectional actuation of said operating member through a given position and requiring reverse movement of said operating member beyond such position prior to subsequent operation of certain of said units by said member.

In witness whereof, I have hereunto subscribed my name.

HENRY N. WADE.